US012718176B2

(12) United States Patent
Von Troll et al.

(10) Patent No.: US 12,718,176 B2
(45) **Date of Patent: *Aug. 25, 2026**

(54) TIME AND ATTENDANCE SYSTEM SUITABLE FOR LARGE OR MOBILE WORK FORCES

(71) Applicant: ALT236,LLC, Fort Lauderdale, FL (US)

(72) Inventors: Oliver Von Troll, Pompano Beach, FL (US); Cheryl L. Doel, Delray Beach, FL (US); Vardan Karapetyan, Boca Raton, FL (US); Yerem Khalatyan, Yerevan (AM)

(73) Assignee: ALT 236 LLC, Fort Lauderdale, FL (US)

( * ) Notice: Subject to any disclaimer, the term of this patent is extended or adjusted under 35 U.S.C. 154(b) by 91 days.

This patent is subject to a terminal disclaimer.

(21) Appl. No.: 18/732,890

(22) Filed: Jun. 4, 2024

(65) Prior Publication Data

US 2024/0320599 A1 Sep. 26, 2024

Related U.S. Application Data

(63) Continuation of application No. 17/564,684, filed on Dec. 29, 2021, now Pat. No. 12,001,990, which is a (Continued)

(51) Int. Cl.
*G06N 20/00* (2019.01)
*G06Q 10/0639* (2023.01)
(Continued)

(52) U.S. Cl.
CPC ....... *G06Q 10/06398* (2013.01); *G06N 20/00* (2019.01); *G06Q 10/105* (2013.01);
(Continued)

(58) Field of Classification Search
CPC .......... G06Q 10/06398; G06Q 10/105; G06Q 30/0185; G06Q 50/08; G06N 20/00;
(Continued)

(56) References Cited

U.S. PATENT DOCUMENTS

2013/0024492 A1 1/2013 Graff et al.
2014/0249877 A1 9/2014 Hull et al.
(Continued)

OTHER PUBLICATIONS

A. Ulku, "The Next Generation In PersonnelVPeople Tracking: Active RFID Technology Has Allowed for Enhanced Security and Safety," in IEEE Consumer Electronics Magazine, vol. 6, No. 4, pp. 122-124, Oct. 2017, doi: 10.1109/MCE.2017.2714418. (Year: 2017).*
(Continued)

*Primary Examiner* — Jonathan P Ouellette
(74) *Attorney, Agent, or Firm* — The Concept Law Group, PA; Scott D. Smiley; Scott M. Garrett

(57) ABSTRACT

A system, method, and apparatus for managing and monitoring productivity on subjects within one or more worksites is disclosed. The system includes a computing device, and in some embodiments a wearable device, configured to collect data associated with an employee on the one or more worksites in real-time in addition to verifying the identity of an employee based on images of the employee captured on the worksite within a geofence in order to prevent fraudulent clocking in/out. The collected data is utilized to track the productivity or lack thereof of the employee on the worksite.

19 Claims, 8 Drawing Sheets

Related U.S. Application Data continuation of application No. 17/126,289, filed on Dec. 18, 2020, now Pat. No. 11,232,387.

(60) Provisional application No. 62/950,858, filed on Dec. 19, 2019.

(51) Int. Cl.

| | |
|---|---|
| ***G06Q 10/105*** | (2023.01) |
| ***G06Q 30/018*** | (2023.01) |
| ***H04B 1/3827*** | (2015.01) |
| ***H04L 67/52*** | (2022.01) |
| *G06Q 50/08* | (2012.01) |
| *G06V 40/16* | (2022.01) |
| *G07C 9/37* | (2020.01) |

(52) U.S. Cl.

CPC ......... *G06Q 30/0185* (2013.01); *H04B 1/385* (2013.01); *H04L 67/52* (2022.05); *G06Q 50/08* (2013.01); *G06V 40/172* (2022.01); *G07C 9/37* (2020.01)

(58) Field of Classification Search

CPC ...... H04B 1/385; H04L 67/52; G06V 40/172; G07C 9/37; G07C 1/10; G07C 9/25; G07C 9/27; G07C 9/28; G07C 9/38; H04W 4/021

USPC .................................. 705/1.1–912, 318, 320

See application file for complete search history.

(56) References Cited

U.S. PATENT DOCUMENTS

| | | | | |
|---|---|---|---|---|
| 2016/0125348 | A1 | 5/2016 | Dyer et al. | |
| 2017/0142548 | A1 | 5/2017 | Buskirk et al. | |
| 2017/0230790 | A1* | 8/2017 | Skomra | G07C 5/008 |
| 2017/0270461 | A1* | 9/2017 | Morgenthau | G08B 21/04 |
| 2018/0173866 | A1 | 6/2018 | Williams | |
| 2019/0057340 | A1 | 2/2019 | Wang | |
| 2019/0137979 | A1* | 5/2019 | Akella | G06N 3/0442 |
| 2019/0343429 | A1* | 11/2019 | Elhawary | A61B 5/6823 |
| 2019/0347597 | A1* | 11/2019 | Asendorf | H04B 1/385 |

OTHER PUBLICATIONS

"Staff Workflow Employee Tracking with Litum RTLS," Litum, Litum Blog, Mar. 6, 2017. (Year: 2017).*

S. B. Utomo and B. Hendradjaya, "Multifactor Authentication on Mobile Secure Attendance System," 2018 International Conference on ICT for Smart Society (ICISS), Semarang, Indonesia, IIEE Xplore 20181129, pp. 1-5. doi: 10.1109/ICTSS.2018.8550017. (Year: 2018).*

International Search Authority of the USPTO, International Search Report and Written Opinion for PCT/US2020/065959, mailed Mar. 25, 2021, pp. 1-8.

V. K. Shukla and N. Bhandari, "Conceptual Framework for Enhancing Payroll Management and Attendance Monitoring System through RFID and Biometric," 2019 Amity International Conference on Artificial Intelligence (AICAI), Dubai, United Arab Emirates, 2019, pp. 188-192, doi: 10.1109/AICAI.2019.8701316 (Year: 2019).

* cited by examiner

TIME AND ATTENDANCE SYSTEM SUITABLE FOR LARGE OR MOBILE WORK FORCES

CROSS-REFERENCE TO RELATED APPLICATIONS

This application claims priority to U.S. patent application Ser. No. 17/564,684, filed Dec. 29, 2021, issued as U.S. Pat. No. 12,001,990 on Jun. 4, 2024, and to U.S. patent application Ser. No. 17/126,289, filed Dec. 18, 2020, issued as U.S. Pat. No. 11,232,387 on Jan. 25, 2022, and through that application to U.S. Provisional Patent Application Ser. No. 62/950,858 filed Dec. 19, 2019, and claims the benefit of those applications, the entireties of which are hereby incorporated by reference.

FIELD OF THE DISCLOSURE

The present invention relates generally to a tracking and verification system, and more specifically systems and methods for productivity monitoring and authentication of employees within a worksite.

BACKGROUND OF THE DISCLOSURE

Historically, detecting and monitoring the whereabouts and the productivity of employees and/or associates of an organization has been an arduous task in certain worksite environments. In particular, construction sites ordinarily cover a widespread area of ample employees and associates many of which have unique purposes on the worksite. However, a common issue for construction and development companies is the inability to verify an employee or associate authorized to be present on one of many worksites of said companies. A current approach is to task an individual with manually verifying the presence and identity of employees at the worksite; however, this approach is not feasible due to the fact that a particular employee may be authorized to be present on multiple worksites and the tasked individual can only account for one worksite at a particular time. In addition, manual verifying, tracking and cost coding of employee activities on the worksite using the aforementioned method not only requires additional overhead, such as manpower, but also falls victim to inefficient and inaccurate collection, managing, and reporting of data acquired on the worksite. This inefficient and inaccurate collection of data results in issues such as inaccurate client billings and erroneous payroll reports which requires a significant amount of time and resources to rectify.

Furthermore, day-to-day fraudulent representation of identity, presence, and productivity of employees on worksites is a common issue for construction and development companies. For example, employees fraudulently clocking in and out of the worksite, employees delegating the tasks to each other without employer authorization, and employees "riding the clock" are all common issues associated with construction worksites. In particular, verification of employees and tracking of employee productivity associated with labor and other applicable tasks performed on a construction worksite are inherently difficult to efficiently detect and analyze in real-time using the aforementioned manual approach. Currently systems exist to manage employee monitoring and productivity tracking; however, these systems not only fail to account for collection of data associated with the workplace in real-time much less accounting for data collected by components of the systems when offline, but also these systems require complex components such as reliable biometric information being collected from employees which results in a significant overhead.

In addition, a frequent tactic used by construction employees to deceive authenticity within the aforementioned existing systems is to provide an image of the construction employee for clocking-in and clocking-out purposes as opposed to live facial recognition of the construction employee at the worksite. Due to this system defect, a construction employee may have a co-worker clock-in on their behalf without the system being able to detect that the construction employee is not physically present on the worksite and/or performing their required task in an efficient manner on a daily basis.

Therefore, there exists a need for a system and method for managing and monitoring authenticity, time, and productivity of subjects on one or more worksites that do not fall victim to the aforementioned issues associated with the current existing systems.

SUMMARY OF THE DISCLOSURE

The invention provides systems and methods for managing and monitoring productivity on subjects within one or more worksites that overcomes the hereinafore-mentioned disadvantages of the heretofore-known devices and methods of this general type and that effectively facilitates the collection, verification, and analyses of data associated with said subjects; in particular, in workplace environments that include various individuals with various tasks required for a widespread setting.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes the method also includes defining, via a server communicatively coupled to a first computing device associated with a first employee, a geofence configured to be allocated to a worksite associated with the first employee. The method also includes receiving, via the server, a plurality of employee specific (ES) data associated with the first employee. The method also includes verifying, via the server, an identity of the first employee based on the plurality of ES data. The method also includes determining, via the server, whether the first computing device is within a predetermined proximity to a second computing device associated with a second employee within the geofence. The method also includes analyzing, via the server, whether the first computing device is in possession of the first employee based on a plurality of productivity data derived from the first computing device. Other embodiments of this aspect include corresponding computer systems, apparatus, and computer programs recorded on one or more computer storage devices, each configured to perform the actions of the methods.

One general aspect, the system also includes a first computing device associated with a first employee. The system also includes a second computing device associated with a second employee. The system also includes a server configured to: define a geofence configured to be allocated to a worksite associated with the first employee, receive a plurality of employee specific (ES) data associated with the first employee, verify an identity of the first employee based on the plurality of ES data, determine whether the first computing device is within a predetermined proximity to the second computing device within the geofence, analyze whether the first computing device is in possession of the first employee based on a plurality of productivity data derived from the first computing device. Other embodiments of this aspect include corresponding computer systems, apparatus, and computer programs recorded on one or more computer storage devices, each configured to perform the actions of the methods.

Although the invention is illustrated and described herein as embodied in a system and methods for managing and monitoring employee identity and productivity, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
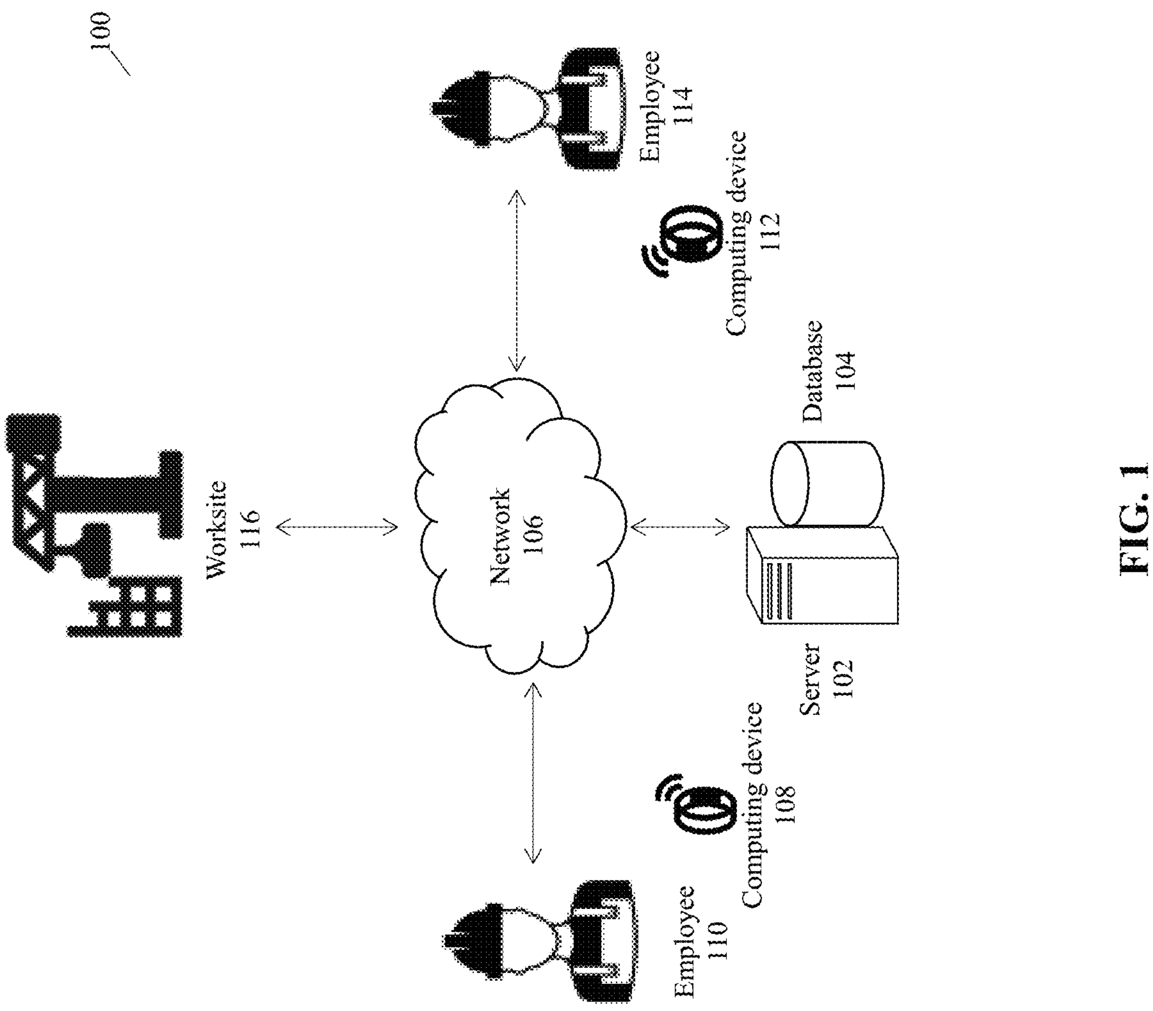
FIG. 1 is a block diagram depicting an exemplary system for managing and monitoring authenticity and productivity in a worksite, according to an example embodiment.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides novel and efficient systems and methods for managing and monitoring identity, location, and productivity of employees and associates on a worksite. Embodiments of the invention provide a method configured to utilize data acquired from an employee on a worksite via a computing device in order to verify the identity of the employee in addition to monitor the productivity of the employee within a defined geofence. Embodiments of the invention further provide a server configured to provide a centralized platform along with manage collection and transmission of data acquired within the worksite in addition to utilize one or more machine learning algorithms on the aforementioned data to make predictions relating to the identity and productivity of the employee on the worksite. Embodiments of the invention further provide an identity verification system configured to not only verify the identity of the employee at the worksite in real-time, but also prevent fraudulent representation of employees when checking into the worksite by ensuring that identification of the employee is based on an on-site live captured image rather than a pre-existing image containing the employee. In addition, embodiments of the invention provide a wearable device configured to be affixed to the employee and collect various types of data associated with the employee along with metrics of the employee's productivity within the worksite. The wearable device provides a novel and unconventional manner of collecting employee data and checking in/out with the system provided by the server even if the wearable device is offline by locally storing acquired data in increments in manner that does not excessively draw power from the power source on the wearable device. The systems and methods described herein provide improvements to the collection, management, and analysis of data associated with an employee within a worksite. By offline, automated, and scalable collection and management of data acquired within a geofence, the processing cost over network, computation, and storage is reduced in addition to improvements employers sustain by having more accurate and efficient data relating to productivity of employees.

Referring now to FIG. 1, a system for managing and monitoring employee productivity 100 is depicted, according to an exemplary embodiment. In one embodiment, system 100 includes a server 102 communicatively coupled to a database 104, a communicative network 106, a first computing device 108 associated with a first employee 110, a second computing device 112 associated with a second employee 114 (hereinafter collective referred to as the "employee"), wherein employees 110 and 114 are configured to perform one or more tasks on a worksite 116 associated with an employer (not shown). As described herein, an employer may be any individual and/or entity having a scope of control over or an agreement to be able to delegate tasks to a representative or associate of the employer. Furthermore, an employee may include, but is not limited to, an independent contractor, part-time worker, manager, volunteer, apprentice/trainee, board member, or any other individual configured to be associated with an entity offering consideration in exchange for services, wherein a worksite may be any premise, physical or virtual, associated with the employee and tasks performed by the employee on behalf of the employer. In some embodiments, system 100 may be applied to any environment wherein a first individual/entity is attempting to receive and analyze identity, location, and productivity of a subject in real-time.

It is to be understood that the employer is associated with server 102 wherein server 102 is configured to provide a centralized platform including an employer side for the employer (or representative thereof) to serve as an admin and an employee side for employees 110 and 114 via one or more graphical user interfaces configured to allow employees 110 and 114 to clock in on worksite 116 on the employee side and the employer to view data and metrics associated with the data collected at worksite 116 transmitted from computing devices 108 & 112 to server 102 over network 106. In one embodiment, system 100 may include a plurality of server 102 which may include, but is not limited to stand-alone and enterprise-class servers operating a server OS such as a MICROSOFT® OS, a UNIX® OS, a LINUX® OS, or other suitable server-based OS. One or more servers may be operated and/or maintained by the same or different entities. In one embodiment, network 106 may be implemented as a Local Area Network (LAN), Wide Area Network (WAN), mobile communication network (GSM, GPRS, CDMA, MOBITEX, EDGE), Ethernet or the Internet, one or more terrestrial, satellite or wireless links, or any medium or mechanism that provides for the exchange of data between the aforementioned components of system 100. Examples of computing devices include a laptop computer, a tablet computer, a smartphone, a wearable, a desktop computer, a Personal Digital Assistant (PDA), and any other mechanism including a processor used to access the internet or on which application programs can be run. System 100 illustrates only one of many possible arrangements of components configured to perform the functionality described herein. Other arrangements may include fewer or different components, and the division of work between the components may vary depending on the arrangement.

Server 102 may be implemented in hardware, software, or a combination of hardware and software. It is to be understood that server 102 is configured to be communicatively coupled to computing devices 108 and 112 in a remote configuration, wherein in one embodiment, computing devices 108 and 112 are configured to locally store an offline employment activity reservoir including acquired data associated with the applicable employee in one or more storage mechanisms allocated on computing devices 108 and 112 allowing computing devices 108 and 112 to operate seamlessly in environments where there is little to no connection to server 102, such as worksite 116. In one embodiment, upon server 102 detecting a connection with computing devices 108 and/or 112, computing devices 108 and/or 112 transmits the acquired data associated with the applicable employee from the offline employment activity reservoir to the server 102. This functionality allows computing devices 108 and 112 to operate at normal capacity while present on worksite 116 while transmitting reporting actions associated with the applicable employee to the offline employment activity reservoir or directly to server 102 subject to the connectivity configuration. In one embodiment, computing devices 108 and/or 112 is configured to collect and transmit to server 102 a plurality of employee specific (ES) data, wherein ES data collected from computing devices 108 and 112 may include, but is not limited to, location/GPS data, sensor data, body temperature, heartrate, motion data (e.g., a direction, an acceleration, a speed, a velocity, a degree of tilt, a degree of rotation, a luminance, etc.), haptic data, or any other applicable type of data configured to be collected by a wearable device known to those of ordinary skill in the art.

It is to be understood that for the purpose of illustration first employee 110 and second employee 114 are co-workers or associates performing tasks on and/or proximate to worksite 116 on behalf of the employer. The examples provided throughout this disclosure presume employees 110 and 114 are authorized to be present on worksite 116 and are tasked with two distinct purposes on worksite 116. In one embodiment, server 102 is configured to generate a geofence based on worksite 116, wherein the geofence encompasses worksite 116 allowing server 102 to detect, track, and analyze actions of employees 110 and 114 performed on worksite 116 by collecting data via computing devices 108 and 112. In one embodiment, computing devices 108 & 112 are designed and configured to allow employees 110 and 114 to check/clock in and out with the employer once computing devices 108 and/or 112 are detected on worksite 116. The process of checking in/out of worksite 116 by employees 110 and 114 may be accomplished by employees 110 and 114 operating on the employee side of the centralized platform operated by server 102 configured to be downloaded on computing devices 108 and/or 112 from a digital distribution service. In one embodiment, checking/clocking in and out is accomplished by server 102 prompting the employee for a selfie image in which the selfie image is captured by at least a camera allocated on computing devices 108 and/or 112, wherein server 102 is configured to determine if the selfie image is an image captured in real-time at worksite 116 or an image of a pre-existing image including the employee.

In one embodiment, the offline employment activity reservoir and/or subsets of data within the offline employment activity reservoir are configured to be stored in database 104 upon connectivity being established between computing devices 108 & 112 and server 102 over network 106 preventing the one or more storage mechanisms allocated on computing devices 108 and 112 from reaching maximum storage capacity due to continuous offloading of data collected by computing devices 108 and 112 to server 102. In one embodiment, upon real-time detection of computing devices 108 and/or 112 being identified outside of the geofence during time periods in which employees should be located within worksite 116, server 102 notifies the admin of first employee 110 and/or second employee 114 exiting worksite 116.

Figure 2:
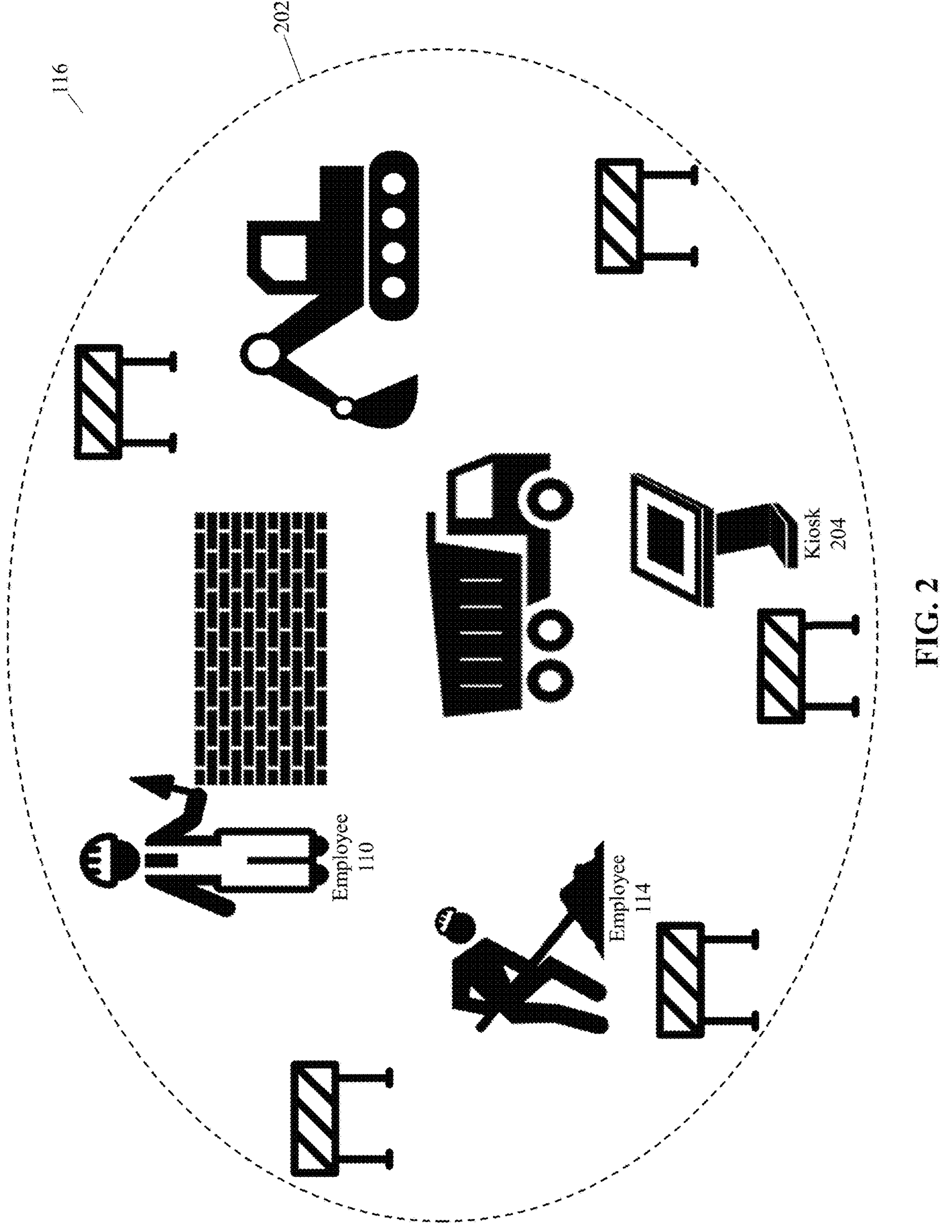
FIG. 2 is a block diagram depicting an exemplary worksite utilizing the system for managing and monitoring authenticity and productivity in a worksite including employees within a geofence, according to an example embodiment.

Referring now to FIG. 2, an illustration of worksite 116 is depicted, according to an exemplary embodiment. In one embodiment, worksite 116 includes a geofence 202 encompassing a plurality of construction equipment in addition to a kiosk 204 configured to be communicatively coupled to server 102 wherein kiosk 204 is configured to serve as a mechanism for allowing computing devices 108 and 112 to clock in and out of worksite 116. It is to be understood that worksite 116 as depicted in FIG. 2 illustrates both first employee 110 and second employee 114 being located within geofence 202 wherein first employee 110 is in possession of computing device 108 while performing a first task and second employee 114 is in possession of computing device 112 while performing a second task distinct from the first task, and data is being continuously collected by computing devices 108 and 112 and maintained in offline employment activity reservoir or transmitted directly to server 102 if connectivity is applicable. In one embodiment, server 102 continuously processing ES data received from computing devices 108 and 112, server 102 is configured to determine productivity of the employee while present on worksite 116, wherein productivity may be depicted via presence of motion or lack thereof, completion of projects (or sub-components) on worksite 116, overall amount of time present on worksite 116, or any other applicable metric configured to illustrate productivity or lack thereof. For example, the ES data may include motion data acquired from first employee 110 indicating that first employee 110 is operating at an inefficient rate based on the amount of time spent on worksite 116 compared to the level of completion of the first task. In one embodiment, the ES data may be utilized to ensure that the first task is not being performed by an employee distinct from first employee. For example, server 102 is configured to determine whether computing device 108 is performing the second task based on ES data which indicates via range of motion, angular velocity, and frequency of movement that computing device 108 is affixed to an employee digging a ditch with a shovel opposed to layering concrete for a wall. In one embodiment, server 102 collects ES data including the heartrate, body temperature, and wearable haptic data (pressure, friction, temperature, etc.-based sensations mediated by nerves in the skin) of employees 110 and 114 from computing devices 108 and 112 to ensure that first employee 110 is not in possession of computing device 112 and second employee 114 is not in possession of computing device 108 based on distinguishable inconsistencies revealed via comparison of currently acquired ES data to previously acquired ES data. For example, server 102 is configured to detect that computing devices 108 and 112 are in possession of the same individual based on similarity of readings relating to the aforementioned acquired data in addition to the proximity of computing devices 108 and 112 for a predetermined period of time; thus, indicating that at least one of employees 110 and 114 are attempting to misrepresent their location and/or their productivity on worksite 116.

Figure 3:
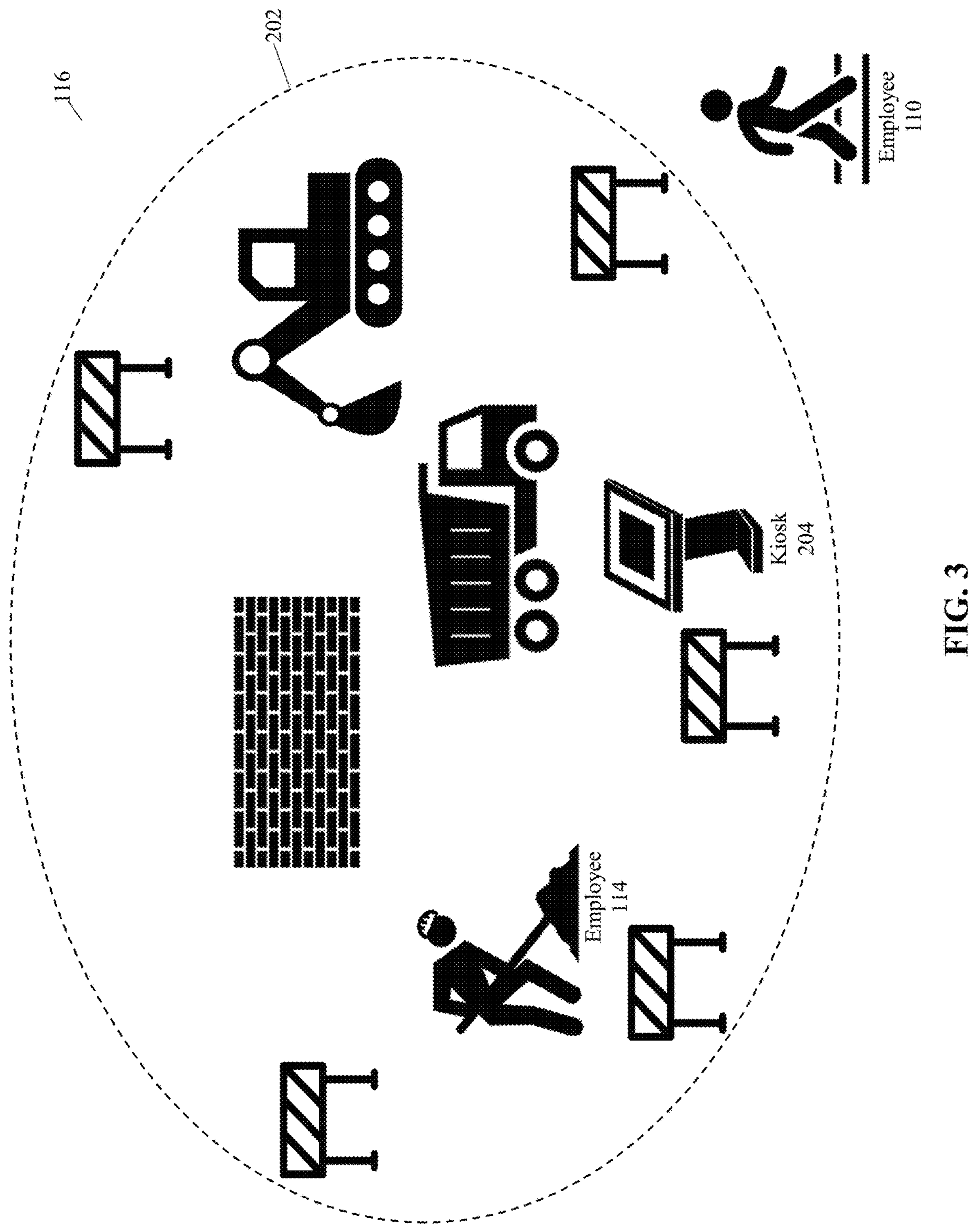
FIG. 3 is a block diagram depicting an exemplary worksite utilizing the system for managing and monitoring authenticity and productivity in a worksite including an employee outside the geofence, according to an example embodiment.

Referring now to FIG. 3, an illustration of worksite 116 is depicted according to an exemplary embodiment wherein first employee 110 is depicted outside of geofence 202. It is to be understood that in the scenario where computing device 108 is in the possession of first employee 110 that ES data is continuously acquired by computing device 108 and included in offline employment activity reservoir and server 102 ultimately notifies the admin that first employee 110 is outside of geofence 202 during hours in which first employee 110 is required be present on worksite 116 and/or purporting to be clocked in; while in the scenario where computing device 108 is in the possession of second employee 114 while first employee 110 is outside of geofence 202, computing devices 108 and 112 communicate in order to transmit to server 102 ES data indicating that second employee 114 is purporting to be first employee 110. In one embodiment, ES data is configured to indicate to server 102 that an employee is not performing a task on worksite 116 that was allocated to them, wherein server 102 may compare and analyze a history of ES data in order to determine that an employee is not currently performing the task that has historically been assigned to him/her.

In one embodiment, kiosk 204 is configured to assist server 102 in defining geo-fence 202 based on the physical location of kiosk 204 within worksite 116 relative to the computing device. In one embodiment, geo-fence 202 may include a plurality of sub-geofences configured to ensure that division of tasks allocated on worksite 116. For example, a first sub-geofence may be allocated to a first area of worksite 116 specifically configured for masonry while a second sub-geofence may be allocated to a second area of worksite 116 specifically configured for excavation; thus, if ES data derived from computing devices 108 and 112 indicate that first employee 110 and/or second employee 114 are outside of their respective sub-geofence for an extended period of time then server 102 alerts the admin. It is to be understood that kiosk 204 is not required in order for employees 110 and 114 to check in/out and/or establish presence on worksite 116. In some embodiments, computing devices 108 and 112 are configured to communicate with one or more satellite based systems in order to ensure that computing devices 108 and 112 are located within geo-fence 202 wherein although geo-fence 202 is established by server 102, ES data confirmed by communications between computing devices 108 and 112 and the one or more satellite based systems is transmitted to server 102 upon verification of the selfie image confirming that employees 110 and 114 are who they purport to be.

Figure 4:
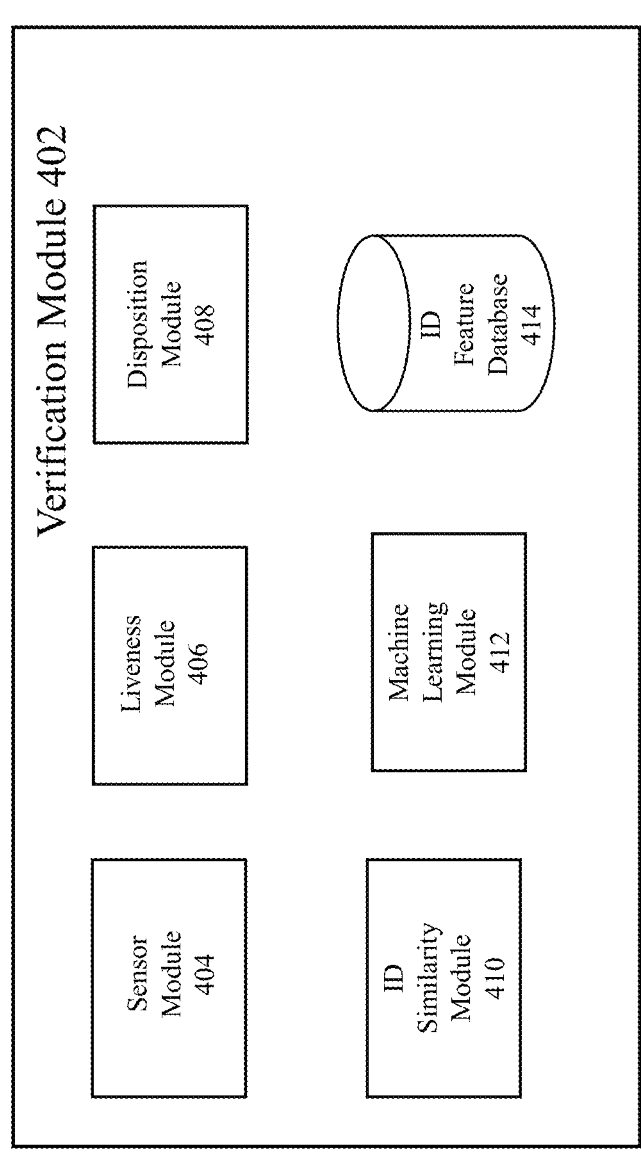
FIG. 4 is a block diagram depicting an exemplary verification module utilized by the system for managing and monitoring authenticity and productivity in a worksite, according to an example embodiment.

Referring now to FIG. 4, a kiosk module 400 associated with kiosk 204 is depicted, according to an exemplary embodiment. In one embodiment, kiosk module 400 is communicatively coupled to server 102 and includes a verification module 402 wherein verification module 402 is configured to be a module of system 100 that utilizes software and/or hardware components to identify and verify the identity of an employee on worksite 116. In one embodiment, verification module 402 includes sensor module 404, a liveness module 406, a disposition module 408, an identification (ID) similarity module 410, a machine learning module 412, and an ID feature database 414. It is to be understood that in some embodiments computing devices 108 and 112 are configured to support and/or assume the responsibilities of verification module 402 allowing computing devices 108 and 112 to verify the identity of the employee without interacting with kiosk 204. In one embodiment, sensor module 404 is designed to include one or more sensors, cameras, and/or imaging devices configured to scan the profile, contours, and other applicable components of the face of an employee. In one embodiment, sensor module 404 is configured to scan one or more biometric sources of an employee including but not limited to fingerprint, iris scan, retina scan, voice identification, or any other applicable physical or behavioral human characteristics that can be used to digitally identify an employee to grant access to worksite 116. It is to be understood that ES data may be acquired by kiosk 204 based off of one or more identifiable features associated with the employee detected by sensor module 404. In one embodiment, one or more initial sets of identifiable features (hereinafter referred to as topical identification content) are stored in ID feature database 414 in a profile record specific to the applicable employee. For example, upon the employee interacting with kiosk 204 or in some embodiments an applicable sensor of an applicable computing device, sensor module 404 actively scans the face of the employee resulting in storing of the one or more identifiable features along with any applicable ES data into the profile record, wherein one or more identifiable features may include but is not limited to shape/size/dimension/positioning of facial features, color of eyes, facial disposition, and any other applicable identifiable profile features. Based on the scanning performed by sensor module 404, server 102 is configured to access ID feature database 414 and perform one or more face detection algorithms wherein the face detection algorithms include but are not limited to feature-based, appearance-based, knowledge-based, template matching, or any other applicable type of face detection algorithm. In one embodiment, liveness module 406 is configured to determine that verification module 402 is interfacing with a physically present subject instead of an inanimate spoof artifact such as a pre-existing image of the employee, wherein liveness module 406 module is configured to generate, timestamp, and delete liveness data within a short timeframe allowing the one or more identifiable features to be stored and the liveness data to be collected at every interaction with verification module 402. It is to be understand that liveness module 406 operates based on established profile records in ID feature database 414 wherein each profile record includes a base reference of the one or more identifiable features of the employee for liveness module 406 to compare the currently acquired one or more identifiable features to the topical identification content. The purpose of liveness module 406 is to ensure that employees 110 and 114 utilize selfie images and/or biometrics acquired at kiosk 204 or at the applicable computing device in order to clock in/out of worksite 116 and prevent employees from spoofing system 100 with inanimate images of an employee. Liveness module 406 transmits data associated with the one or more identifiable features to server 102 allowing server 102, alone or in combination with computing devices 108 and 112, to verify the employee is a live subject based on at least the one or more identifiable features and/or the topical identification content.

In one embodiment, server 102 determines an identification similarity threshold based on the topical identification content or the employees established profile record including the topical identification content (also referred to as an employee identification record) configured to prevent spoofing and/or fraudulent representation of an employee during clocking in/clocking out. It is to be understood that the identification similarity threshold is established by server 102 and configured to function as a mechanism to initiate flagging of an employee attempting to check-in/out of worksite 116. In one embodiment, computing devices 108 & 112 and/or kiosk 204 are configured to utilize sensor module 404 to scan the face of the employee and evaluate whether a query associated with the employee exceeds the identification similarity threshold, wherein in some embodiments, the evaluation is based on a weighted comparison of changeable features including but not limited to hair color, eye color, hair length, length/width of facial features, disposition, or any other applicable form of identifying an individual. For example, verification module 402 may actively collect data acquired by sensor module 404 and utilize server 102 to compare the acquired data to the established profile record associated with the employee in ID feature database 414, wherein if the evaluation and comparison of the one or more identifiable features to the topical identification content exceed the identification similarity threshold then server 102 flags the employee and prompts the admin that first employee 110 may be fraudulently represented by someone else. In one embodiment, the evaluation and comparison of the one or more identifiable features takes into account the source of the scanning of the one or more identifiable features (computing devices 108 & 112 and/or sensor module 404) in order to determine which established profile record in ID feature database 414 should be used by server 102 to determine the identification similarity threshold. For example, if computing device 108 is detected within the proximity of at least one of kiosk 204, verification module 402, and/or sensor module 404 server 102 would know to establish the identification similarity threshold based on the employee identification record associated with first employee 110 due to the fact that computing device 108 is associated with first employee 110.

In one embodiment, liveness module 406 transmits data associated with the one or more identifiable features from sensor module 404 to server 102 allowing server 102 to compare the one or more identifiable features to one or more images of the employee stored on the employee identification record associated with the employee. In one embodiment, the one or more identifiable features are stored in the profile record incrementally allowing the profile record to have a history of check-in/check-out information in addition to the applicable image used for each interaction with verification module 402 allowing server 102 to provide the admin with progressive changes associated with the disposition of the employee. The incremental storing in the employee identification record allows the admin to view one or more user interfaces depicting a history of dispositions of the employee provided by the disposition module 408 allowing the admin to determine if misrepresentation is occurring during the checking-in/out process. It is to be understood that over an extended period of time an individual may progressively adjust or alter one or more identifiable features (i.e., grow a beard, get a haircut, plastic surgery, etc.); however, the primary purpose of disposition module 408 is to actively track and account for adjustments and variations to dispositions and the one or more identifiable features of an employee in order to ensure that erroneous flagging of an employee does not occur or that the identification similarity threshold is not erroneously exceeded based on the employee altering or adjusting one or more identifiable features. In one embodiment, ID similarity module 410 is utilized by verification module 402 in order to determine, with the assistance of server 102 or alone, confirmation of the individual attempting to check-in/out of worksite 116 based on an employee identification number associated with the employee identification record, wherein if the employee identification number is flagged based on exceeding identification similarity threshold, then server 102 notifies the admin. It is to be understood that ID similarity module 410 is configured to issue timestamps for a particular employee associated with a particular worksite based on the employee identification number which directly correlates to the checking-in/out of the particular employee. For example, server 102 provides a detailed user interface including data sourced from ID feature database 414 and the applicable employee identification record presented based on the employee identification number and depicting the timestamps reflecting checking-in/out of worksite 116 along with captured images at the timestamps. Furthermore, ID similarity module 410 is configured to verify whether identification similarity threshold has been exceeded erroneously and provide authentication of the individual checking-in/out.

In one embodiment, server 102 may utilize machine learning module 412 to apply one or more machine learning algorithms to data collected by system 100 in order to generate predictions based on the collected data. Machine learning module 412 utilizes a machine learning model or a rule-based model in order generate predictions associated with identity, verification, and habits of an employee performing tasks on worksite 116. For example, if the model is a machine-learned model, then one or more machine learning techniques are used to "learn" weights of different features, which weights are then utilized by server 102 to generate one or more predictions associated with identity and/or task performance efficiency by employees on worksite 116 based on data collected from computing devices 108 and 112, kiosk 204, verification module 402, or any combination thereof. The features, also known as feature values, associated with the weights include but are not limited to ES data, one or more identifiable features, geographic/GPS data, productivity data, or any other applicable data configured to be collected by computing devices 108 and 112, kiosk 204, verification module 402, or any combination thereof.

In one embodiment, server 102 is configured to generate a classification model generated based on training data utilizing the one or more aforementioned machine learning techniques, wherein the feature values are configured to be inserted into the classification model. Machine learning is the study and construction of algorithms that can learn from, and make predictions on, data. Such algorithms operate by building a model from inputs in order to make data-driven predictions or decisions. Thus, a machine learning technique is used to generate a statistical that is trained based on a history of attribute values associated with data utilized within system 100, such as ES data and the one or more identifiable features. The machine-learned model is trained based on multiple attributes (or factors) described herein. In machine learning parlance, such attributes are referred to as "features". In an embodiment, various feature weights or coefficients are established in order to accurately generate predictions for system 100. To generate and train a machine-learned model, a set of features is specified and training data is generated, wherein the training data and instances of the training data correspond to data collected by server 102, or any combination thereof. In addition, the training data is configured to be dynamically acquired over long periods of time. For example, a new machine-learned model is generated regularly, such as every hour, day, month, week, or other time period. Thus, the new machine-learned model may replace a previous machine-learned model. Newly acquired or changed training data may be used to update the model.

Figure 5:
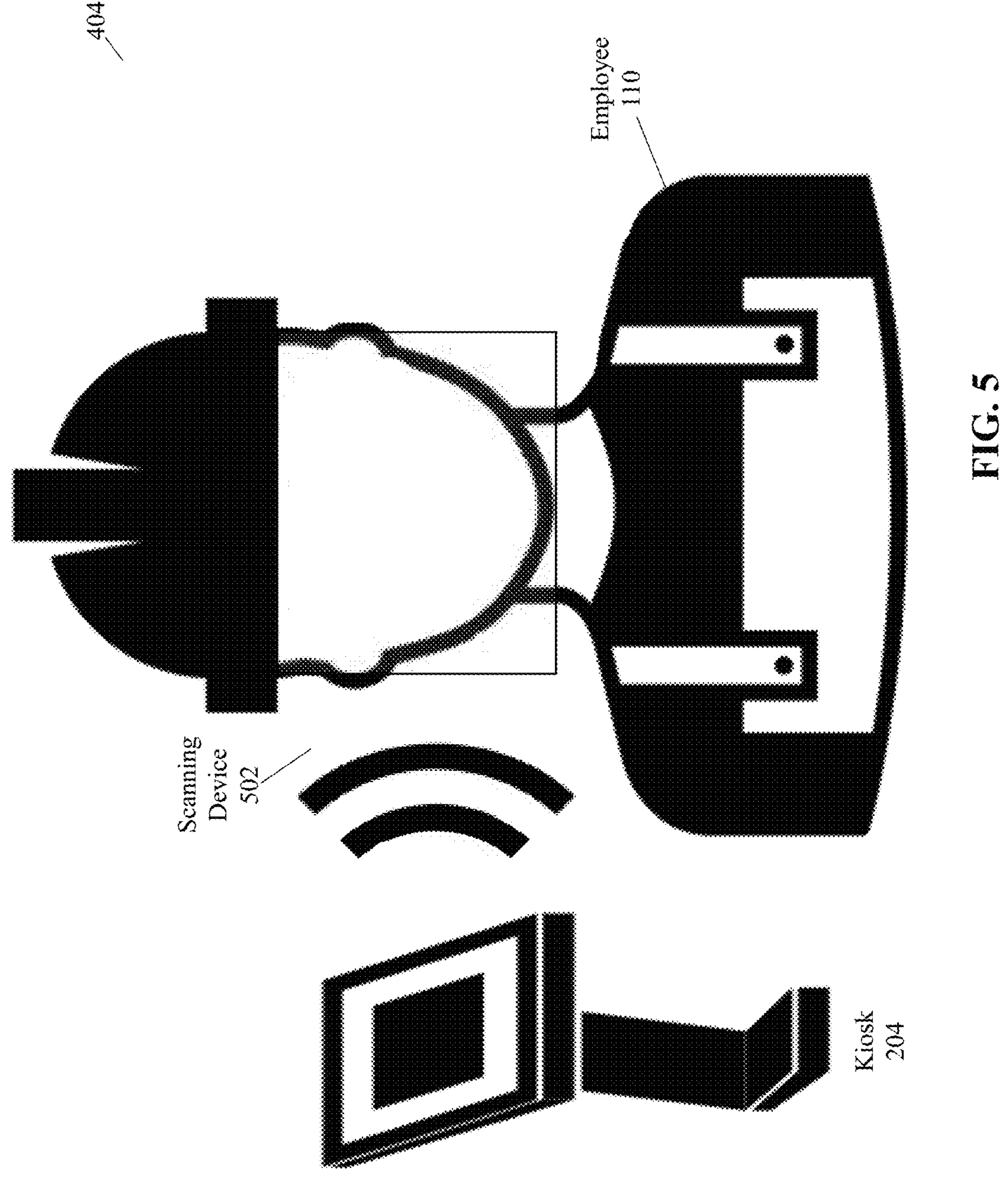
FIG. 5 is a block diagram depicting an exemplary sensor module utilized by the system for managing and monitoring authenticity and productivity in a worksite, according to an example embodiment.

Referring now to FIG. 5, sensor module 404 is depicted, according to an exemplary embodiment. It is to be understood that sensor module 404 may be a component of verification module 402 integrated into kiosk 204, and in some embodiments, sensor module 404 is an independent module configured to be communicatively coupled to at least one of server 102 and computing devices 108 and 112. In one embodiment, sensor module 404 includes a scanning device 502 configured to acquire two-dimensional or three-dimensional topographical data of the body; however, in some embodiments scanning and verification of an employee may be accomplished by biometrics (speech recognition, iris recognition, fingerprint, etc.), measurements of the body (internal temperature, heartbeat, blood circulation, etc.), or any other identity verifying data known to those of ordinary skill in the art. Scanning device 502 may include but is not limited to an optical scanning unit, an image forming device, or any other applicable software, hardware, or combination thereof known to those of ordinary skill in the art configured to perform comprehensive screening and analysis of a subject. It is to be understood that the employee may have the scanning of the body performed at kiosk 204 or computing device 108 and 112 in order to establish that the employee is present and verification of identity is confirmed at worksite 116 in real time wherein recorded data relating to the scanning and verification of the employee is stored in offline employment activity reservoir in embodiments where kiosk 204 or computing device 108 and 112 are not communicatively coupled to server 102 over network 106.

Figure 6:
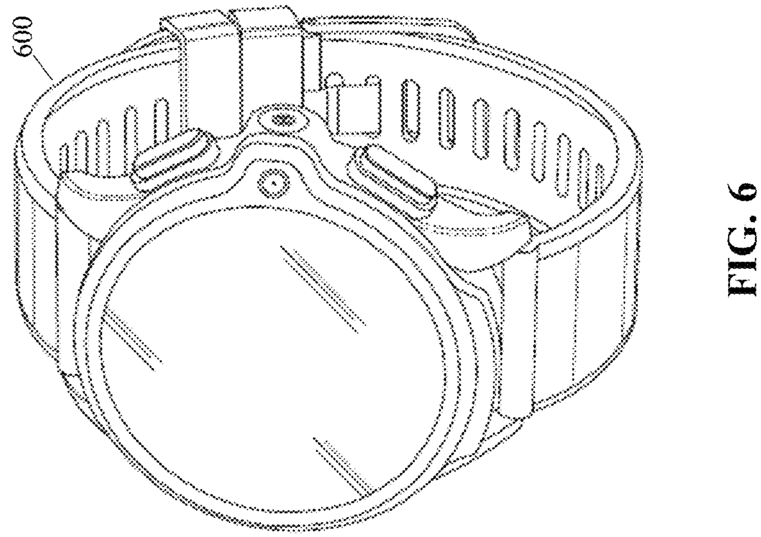
FIG. 6 is a prospective view of an exemplary wearable device utilized by the system for managing and monitoring authenticity and productivity in a worksite, according to an example embodiment.

Referring now to FIG. 6, a wearable device 600 is depicted, according to an exemplary embodiment. It is to be understood that in some embodiments computing devices 108 and 112 are wearable device 600 wherein wearable device 600 may be a watch, wristband, anklet, necklace, or any other wearable device article configured to be affixed to an individual. In one embodiment, wearable device 600 may include one or more stretchable supercapacitors configured to store energy through charge separation. In one embodiment, wearable device 600 includes one or more energy saving components such as but not limited to Wi-Fi/Network-based radio, wake-up radio, dead reckoning chip, low-dropout regulators (LDOs), low-power microcontrollers, any other applicable energy saving practices known to those of ordinary skill in the art configured to allow the power source of wearable device 600 to connect directly to radio modules and other peripherals opposed to drawing energy directly from the battery voltage. It is to be understood that wearable device 600 is designed and configured to include a programmable fast-charge current capability configured to be controlled by server 102 along with motion sensors, IMU sensors, biological activity sensors, GPS tracking sensors, and any other applicable sensors configured to be integrated into wearable devices. In one embodiment, wearable device 600 may further include a low-power draining user interface configured to allow the employee to have access to applicable data associated with system 100 in addition to the employee side of the centralized platform without draining significant power supply. It is to be understood that wearable device 600 is configured to be communicatively coupled to server 102, wherein wearable device 600 includes at least a processor configured to incrementally transmit collected data to server 102 when communicatively coupled, and offline employment activity reservoir when not communicatively coupled.

Figure 7:
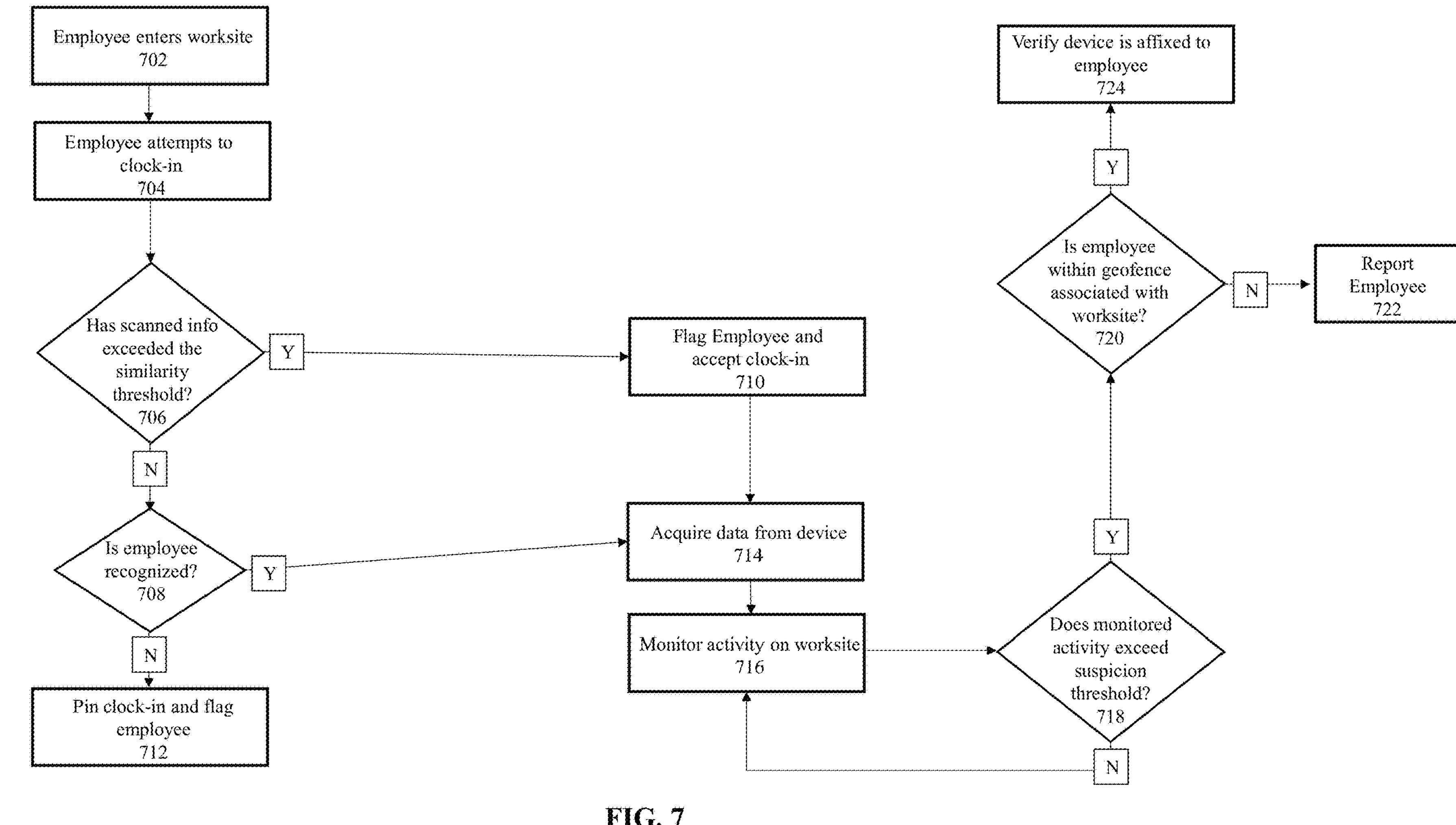
FIG. 7 is a block diagram illustrating an exemplary method for managing and monitoring authenticity and productivity in a worksite, according to an example embodiment.

Referring now to FIG. 7, a method for managing and monitoring identity, location, and productivity 700 is depicted, according to an exemplary embodiment. It is to be understood that the following steps are not limited to application at a worksite and may be applied to any applicable setting associated with determining productivity of an individual. At step 702, the employee enters worksite 116, wherein in a preferred embodiment, computing device 108 is in possession of first employee 110 and is automatically detected by kiosk 204 and/or server 102. At step 704, first employee 110 attempts to clock-in/check-in/punch-in at worksite 116. It is to be understood that this step may be accomplished by first employee 110 by utilizing kiosk 204, the employee side of the centralized platform operating on computing device 108, or in some embodiments, a manual check-in/clock-in/punch-in process known to those of ordinary skill in the art. An example of the manual check-in/clock-in/punch-in process is first employee 110 utilizing an employee specific pin code and/or employee ID configured to be inputted into at least one of kiosk 204 or computing device 108, wherein when the employee is flagged a plurality of images of the employee utilized to check-in are associated with the employee ID and stored in the employee identification record. In one embodiment, check-in/clock-in/punch-in is enabled by server 102 based on computing device 108 indicating to server 102 that first employee 110 is within geofence 202. In one embodiment, detection of computing device 108 may be based upon geographic/location data acquired by computing device 108 in addition to, but not limited to, ES data, RF signals, wireless links, or any other applicable wireless links configured to be emitted from a computing device. It is to be understood that in some embodiments, clocking in/out may be performed simply by computing device 108 being detected within geofence 202 wherein currently acquired ES data is compared to previously acquired ES data stored in the employee identification record associated with first employee 110 in order to determine that computing device 108 is within geofence 202 and that computing device 108 is not in possession of an individual other than first employee 110. For example, if computing device 108 is in possession of second employee 114 attempting to clock-in on behalf of first employee 110, then computing device 108, in the wearable device embodiment, collects current ES data and compares the current ES data to previously acquired ES data stored in the employee identification record in order for server 102 to determine the stark distinction between the sets of ES data, flag the employee upon the detection, and alert the admin. In some embodiments, the aforementioned scanning process is performed on scanning device 502 allowing an indicator to be generated by computing device 108 illustrating to server 102 that computing device 108 is operational and present on worksite 116. At step 708, as the one or more identifiable features are acquired during the scanning, server 102 determines if the one or more identifiable features exceed the identification similarity threshold, wherein if the identification similarity threshold is not exceeded then step 710 occurs in which ES data is acquired from computing device 108, first employee 110 is flagged, and the employee is successfully checked-in/out of worksite 116. Otherwise, step 712 occurs in which first employee 110 is required to use the aforementioned manual check-in/clock-in/punch-in process and server 102 flags the employee attempting to check-in/out and reports the event to the admin over network 106. It is to be understood that flagging of an employee does not prevent the employee from completing the action of checking-in/out; however, in some embodiments, the flagging of the employee allows server 102 to notify the admin of a fraudulent and/or suspicious attempt to check-in/out of worksite 116, unproductive and/or suspicious activity within worksite 116, or activity outside of geo-fence 202 during work hours. During the ES data collection process, computing device 108 actively stores applicable subsets of ES data in offline employment activity reservoir allowing server 102 to retrieve the applicable subsets from offline employment activity reservoir when in communicative coupling with computing device 108 cumulatively resulting in the power source of computing device 108 being significantly preserved. At step 714, assuming first employee 110 and second employee 114 are checked-in to worksite 116 via computing devices 108 & 112 respectively, computing devices 108 & 112 are actively collecting data from the one or more aforementioned sensors associated with computing devices 108 & 112, wherein the data is transmitted to server 102 to determine the level of productivity of first employee 110 and second employee 114. At step 716, the activities of first employee 110 are continuously monitored within and outside of geofence 202 wherein data collected from computing devices 108 & 112 is actively transmitted to server 102 from the device directly or from offline employment activity reservoir. At step 718, server 102 makes a determination as to whether the monitored activity derived from the ES data exceeds a suspicious activity threshold, wherein if not, computing devices 108 & 112 continue to collect ES data for monitoring and analysis purposes. However, if the suspicious activity threshold has been exceeded then step 720 occurs in which server 102 determines whether first employee 110 and second employee 114 are within geofence 202. If server 102 determines that at least one of first employee 110 and second employee 114 are not within geofence 202, then step 722 occurs in which server 102 reports the employee detected outside of geofence 202 during work hours to the admin via the employee side of the centralized platform. Otherwise, step 724 occurs in which computing devices 108 & 112 are verified to ensure that they are in possession and/or affixed to first employee 110 and second employee 114 respectively. In one embodiment, the suspicious activity threshold may be exceeded via a plurality of instances that indicate possession of computing device 108 by an inappropriate party or unauthorized presence outside geofence 202. Server 102 is configured to compare the current ES data being acquired from computing device 108 to ES data specific to computing device 108 previously collected and stored in employee identification record; thus, server 102 is configured to detect based off of the comparison of datasets that first employee 110 is underperforming, missing in action, performing an unallocated task, and/or over performing to a point where it is inefficient. For example, server 102 may determine that computing devices 108 & 112 are in possession of the same individual based on ES data indicating that computing device 108 is collecting an unconventional body temperature, heart rate, and range of motion matching the ES data associated with computing device 112 allowing server 102 to determine that computing devices 108 & 112 are in possession of the same individual.

Figure 8:
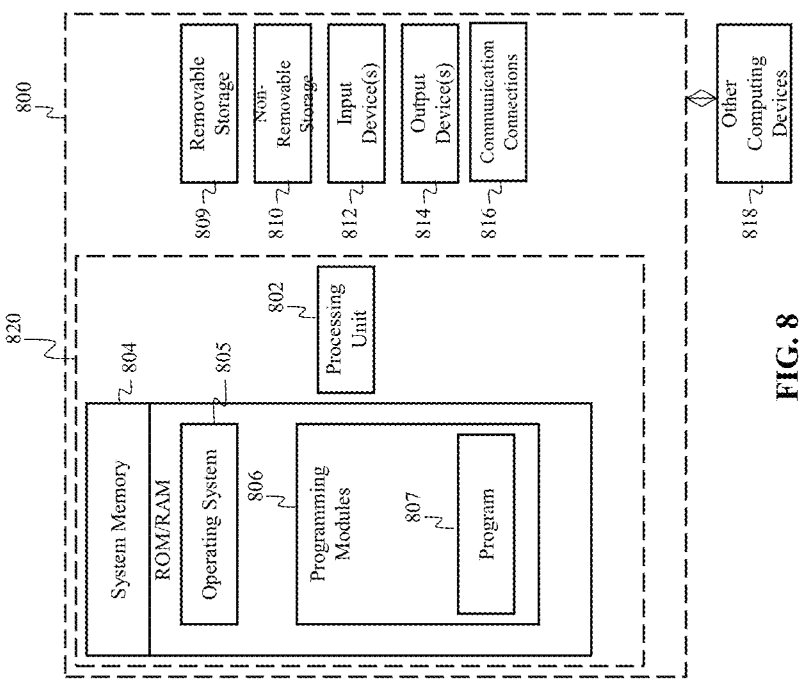
FIG. 8 illustrates a computer system according to exemplary embodiments of the present technology.

FIG. 8 is a block diagram of a system including an example computing device 800 and other computing devices. Consistent with the embodiments described herein, the aforementioned actions performed by devices 108, 112, and server 102 may be implemented in a computing device, such as the computing device 800 of FIG. 8. Any suitable combination of hardware, software, or firmware may be used to implement the computing device 800. The aforementioned system, device, and processors are examples and other systems, devices, and processors may comprise the aforementioned computing device. Furthermore, computing device 800 may comprise an operating environment for system 100 and process/method 700. Process 700, and data related to said processes may operate in other environments and are not limited to computing device 800.

With reference to FIG. 8, a system consistent with an embodiment of the invention may include a plurality of computing devices, such as computing device 800. In a basic configuration, computing device 800 may include at least one processing unit 802 and a system memory 804. Depending on the configuration and type of computing device, system memory 804 may comprise, but is not limited to, volatile (e.g. random access memory (RAM)), non-volatile (e.g. read-only memory (ROM)), flash memory, or any combination or memory. System memory 804 may include operating system 805, and one or more programming modules 806. Operating system 805, for example, may be suitable for controlling computing device 800's operation. In one embodiment, programming modules 806 may include, for example, a program module 807 for executing the actions of server 102 and devices 108 and 112, for example. Furthermore, embodiments of the invention may be practiced in conjunction with a graphics library, other operating systems, or any other application program and is not limited to any particular application or system. This basic configuration is illustrated in FIG. 8 by those components within a dashed line 820.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by a removable storage 809 and a non-removable storage 810. Computer storage media may include volatile and nonvolatile, removable and non-removable media implemented in any method or technology for storage of information, such as computer readable instructions, data structures, program modules, or other data. System memory 804, removable storage 809, and non-removable storage 810 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 800. Any such computer storage media may be part of device 800. Computing device 800 may also have input device(s) 812 such as a keyboard, a mouse, a pen, a sound input device, a camera, a touch input device, etc. Output device(s) 814 such as a display, speakers, a printer, etc. may also be included. The aforementioned devices are only examples, and other devices may be added or substituted.

Computing device 800 may also contain a communication connection 816 that may allow device 800 to communicate with other computing devices 818, such as over a network in a distributed computing environment, for example, an intranet or the Internet. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 804, including operating system 805. While executing on processing unit 802, programming modules 806 (e.g. program module 807) may perform processes including, for example, one or more of the stages of the process 700 as described above. The aforementioned processes are examples, and processing unit 802 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

The claims appended hereto are meant to cover all modifications and changes within the scope and spirit of the present invention.

What is claimed is:

1. A method comprising:

defining, by a server, a geofence corresponding to a worksite on which a first employee is assigned to work, the first employee assigned a first computing device that is operable to collect first employee specific (ES) data and communicate the first ES data to a server;

wherein, when the first computing device lacks communicative coupling to the server, the first ES data collected by the first computing device is incrementally stored in an offline employment activity reservoir configured to reduce power consumption of the power source of the first computing device during collection of the first ES data, wherein the first communication device transmits stored ES data only upon subsequently being capable of communicating with the server;

receiving, at the server, the first ES data collected by the computing device, wherein the first ES data collected by the first computing device includes at least first haptic data collected by the first computing device;

determining, via the server, that the first employee is not performing a task assigned to the first employee based on the first ES data collected from the first computing device at the server, wherein the first ES data collected is acquired within the geofence for a predetermined period of time; and responsive to the server determining that the first employee is not performing the task, the server generating a notification at an employer side user interface of the server.

2. The method of claim 1, further comprising:

analyzing whether the first computing device is in the possession of the first employee by:

comparing the first haptic data collected by the first computing device with second haptic data collected by a second computing device assigned to a second employee; and determining, as a result of comparing the first haptic data with the second haptic data, a similarity between the first haptic data collected by the first computing device and the second haptic data collected by the second computing device.

3. The method of claim 2, wherein determining the similarity between the first haptic data collected by the first computing device and the second haptic data collected by the second computing device comprises determining a similarity in a heartbeat in the first haptic data collected by the first computing device and a heartbeat in the second haptic data collected by the second computing device.

4. The method of claim 2, wherein the first ES data collected by the first computing device includes location data indicating a location of the first computing device at a given time, a second ES data collected by the second computing device includes location data indicating a location of the second computing device at a given time, analyzing whether the first computing device is in the possession of the first employee comprises:

comparing the location data of the first computing device with the location data of the second computing device; and determining, as a result of comparing the location data, a similarity between the location data of the first computing device with the location data of the second computing device.

5. The method of claim 1, further comprising:

verifying, via the first computing device, the first employee is a live subject based on the plurality of identifiable features.

6. The method of claim 1, further comprising:

storing training data that comprises a plurality of training instances, each of which includes a plurality of feature values;

using one or more machine learning techniques to train a classification model based on the training data;

identifying a first plurality of feature values associated with the first employee;

based on the first plurality of feature values, determining whether the first ES data is substantially similar to a second ES data of a second employee; and wherein determining comprises inserting the first plurality of feature values into the classification model that generates an output that indicates a plurality of productivity data associated with the first employee.

7. The method of claim 6, further comprising:

storing training data that comprises the plurality of training instances, each of which includes the plurality of feature values;

using one or more machine learning techniques to train a classification model based on the training data;

identifying a second plurality of feature values associated with the second employee;

based on the second plurality of feature values, determining whether the second employee is the first employee; and wherein determining comprises inserting the second plurality of feature values into the classification model that generates an output that indicates a plurality of productivity data associated with the second employee.

8. The method of claim 1, further comprising:

storing locally, via the first computing device, a plurality of reporting actions associated with the first employee performed within the geofence of the worksite.

9. The method of claim 8, further comprising:

uploading to the server the plurality of reporting actions associated with the first employee upon the server detecting a communicative coupling between the first computing device and a communicative network.

10. A system comprising:

a first computing device, including a power source, that is associated with a first employee and that collects employee specific (ES) data and which transmits the ES data that is collected, wherein the ES data collected by the first computing device is incrementally stored in an offline employment activity reservoir configured to reduce power consumption of the power source of the first computing device during collection and transmission of the ES data; and a server configured to:

define a geofence configured to be allocated to a worksite associated with the first employee;

receive ES data collected by the first computing device, wherein the ES data collected by the first computing device include a at least haptic data collected by the first computing device;

determine whether the first computing device is in the possession of the first employee based on the ES data collected by the first computing device;

generate a notification at an employer side user interface in response to the server determining that the first computing device is not in possession of the first employee; and wherein, the first computing device stores the ES data when the first computing device lacks communicative coupling to the server, and transmits the stored ES data only upon subsequently being capable of communicating with the server.

11. The system of claim 10, wherein the server is further configured to:

analyze whether the first computing device is in the possession of the first employee by being configured to compare the haptic data collected by the first computing device with haptic data collected by a second computing device associated with a second employee; and determine, as a result of comparing the haptic data, a similarity between the haptic data collected by the first computing device and the haptic data collected by the second computing device.

12. The system of claim 11, wherein the server being configured to determine the similarity between the haptic data collected by the first computing device and the haptic data collected by the second computing device comprises the server being configured to determine a similarity in a heartbeat in the haptic data collected by the first computing device and a heartbeat in the haptic data collected by the second computing device.

13. The system of claim 11, wherein the ES data collected by the first computing device includes location data indicating a location of the first computing device at a given time, ES data collected by the second computing device includes location data indicating a location of the second computing device at a given time, the server being configured to analyze whether the first computing device is in the possession of the first employee comprises the server being configured to:

compare the location data of the first computing device with the location data of the second computing device; and determine, as a result of comparing the location data, a similarity between the location data of the first computing device with the location data of the second computing device.

14. The system of claim 10, further comprising:

a sensor communicatively coupled to the server configured to scan a plurality of identifiable features associated with the first employee;

wherein the server is further configured to:

compare the plurality of identifiable features to a plurality of topical identification content stored on a database communicatively coupled to the server;

determine an identification similarity threshold associated with the first employee based on a stored established employee identification record; and flag the first employee based on the identification similarity threshold being exceeded by the plurality of identifiable features.

15. The system of claim 14, wherein the plurality of identifiable features is a subset of the plurality of ES data.

16. The system of claim 10, wherein the server is further configured to:

store training data that comprises a plurality of training instances, each of which includes a plurality of feature values;

use one or more machine learning techniques to train a classification model based on the training data;

identify a first plurality of feature values associated with the first employee; and determine whether the ES data of the first employee is substantially similar to ES data of a second employee based on the first plurality of feature values; and wherein the determination comprises inserting the first plurality of feature values into the classification model that generates an output that indicates a plurality of productivity data associated with the first employee.

17. The system of claim 16, wherein the server is further configured to:

store training data that comprises the plurality of training instances, each of which includes the plurality of feature values;

use one or more machine learning techniques to train a classification model based on the training data;

identify a second plurality of feature values associated with the second employee;

determine whether the second employee is the first employee based on the second plurality of feature values; and wherein the determination comprises inserting the second plurality of feature values into the classification model that generates an output that indicates a plurality of productivity data associated with the second employee.

18. The system of claim 16, wherein the first and second computing devices are configured to:

store a plurality of reporting actions associated with the first employee second employee, respectively, performed within the geofence of the worksite.

19. The system of claim 16, wherein the first computing device is configured to:

store a plurality of reporting actions associated with the first employee performed within the geofence of the worksite.

* * * * *